A. R. YOST.
OIL-CUP FOR JOURNALS.

No. 174,611. Patented March 7, 1876.

WITNESSES:  INVENTOR: Amer R. Yost
BY
ATTORNEYS.

UNITED STATES PATENT OFFICE.

AMER R. YOST, OF SOMERSET, OHIO.

IMPROVEMENT IN OIL-CUPS FOR JOURNALS.

Specification forming part of Letters Patent No. 174,611, dated March 7, 1876; application filed February 16, 1876.

*To all whom it may concern:*

Be it known that I, AMER R. YOST, of Somerset, in the county of Perry and State of Ohio, have invented a new and Improved Oil-Cup for Journals and Axles; and I do hereby declare that the following is a full, clear, and exact description of the same.

My invention relates to an improvement in that class of lubricators which are permanently attached to a shaft or axle and provided with a device for forcing the lubricant out of the reservoir between, or in contact with, the friction-surfaces.

The invention relates to hinging a piston or disk to a spiral spring, which constitutes the the stem or body of the plunger employed for forcing the lubricant out of the cup or reservoir; and it relates, secondly, to the general construction of parts, as hereinafter described and claimed.

Figure 1:
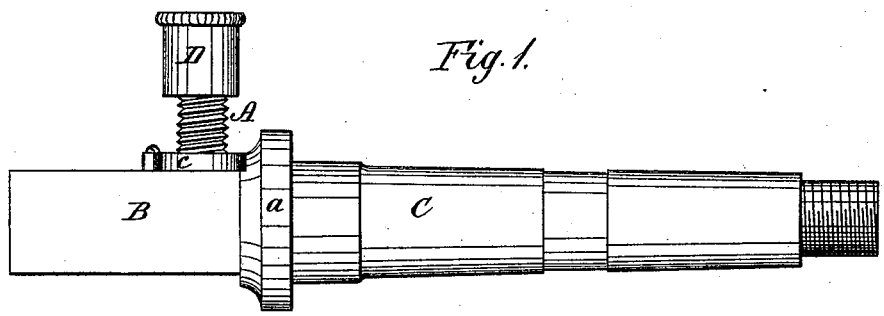
Figures 2, 3:
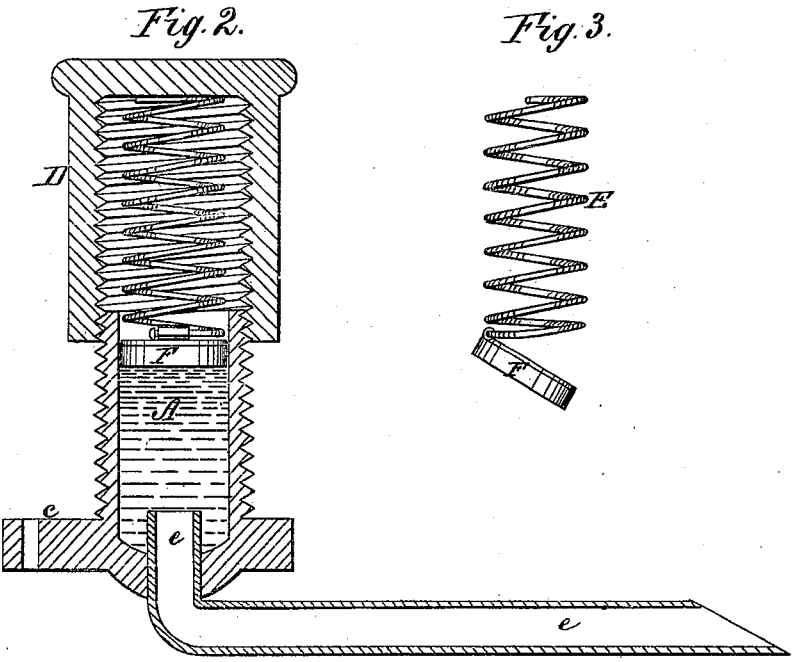

In the accompanying drawing, forming part of this specification, Figure 1 is a side elevation of a fragment of an axle, showing my improvement attached; Fig. 2, an enlarged sectional elevation of the oil-cup, air-reservoir, and the duct leading therefrom; Fig. 3, an elevation of the spring-plunger.

The oil-cup or reservoir A is cylindrical in form, screw-threaded exteriorly, and secured to the axle B, contiguous to the collar *a* of its journal C, by means of screws which pass through a base-flange, *c*. A tube or duct, *e*, leads from the bottom of the reservoir A to a groove formed in the upper part of the journal C.

The cap or cover D of the reservoir is of corresponding cylindrical shape, and has a coincident internal screw-thread to adapt it for vertical adjustment, as hereinafter described.

My improved plunger is composed of the spiral spring E, coiled into cylindrical form, and a piston, F, which is hinged to the lower end of the spring, as shown. The piston may be constructed after the manner of ordinary pump-pistons, or in any manner which will adapt it to fit the reservoir A with sufficient accuracy to prevent the lubricant escaping past it when forced downward.

The operation of the lubricator is as follows: The cap D and the plunger having been removed, the reservoir A is supplied with oil or grease sufficient to nearly fill it, and the plunger and cap replaced, the latter being merely screwed on the top of the reservoir, as shown in Figs. 1 and 2. The piston F will then rest on the surface of the lubricant, and the spring E extend up into the chamber of the cap. When it is desired to increase the supply of the lubricant to the friction-surfaces, one or more turns are given to the cap D, thus compressing the spring E and forcing the piston F downward and the lubricant of the reservoir through the duct *e*. The action of the spring is in general such as to cause the lubricant to be fed to the friction-surfaces gradually, but this depends mainly upon the nature of the lubricant and the degree of friction between the piston and sides of the reservoir.

The object of hinging the piston to the spring is to enable it to open or turn downward, when being drawn out, thus admitting air to supply the vacuum which would otherwise be created beneath it, and preventing any portion of the black or dirty lubricating material which fills or surrounds the discharge-opening of duct *e* from being drawn up into the reservoir.

I do not claim a piston provided with a spring-stem, nor an oil-cup having a cap secured by a screw-thread; but

What I claim is—

1. The piston hinged to the end of the spring to adapt it to assume an inclined position when the plunger is being withdrawn from the cup, as and for the purpose specified.

2. The combination of the oil-cup and cap therefor, respectively, screw-threaded exteriorly and interiorly throughout their length, and the plunger having a hinged valve and a spring-stem adapted to fit the cavity or chamber of the cup, all as shown and described, whereby the adjustment of the cap compresses the spring and thus gradually forces out the lubricant.

The above specification of my invention signed by me this 9th day of February, A. D. 1876.

AMER R. YOST.

Witnesses:
SOLON C. KEMON,
CHAS. A. PETTIT.